( 12 ) United States Patent
Kim et al.

(10) Patent No.: US 9,184,602 B2
(45) Date of Patent: Nov. 10, 2015

(54) CELL BALANCING CIRCUIT AND BATTERY PACK HAVING THE SAME

(71) Applicants: Tae-Jin Kim, Yongin-si (KR); Joon-Soo Bae, Yongin-si (KR)

(72) Inventors: Tae-Jin Kim, Yongin-si (KR); Joon-Soo Bae, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 280 days.

(21) Appl. No.: 13/728,373

(22) Filed: Dec. 27, 2012

(65) Prior Publication Data

US 2014/0042972 A1     Feb. 13, 2014

(30) Foreign Application Priority Data

Aug. 13, 2012    (KR) ........................ 10-2012-0088411

(51) Int. Cl.
     *H02J 7/00*           (2006.01)
(52) U.S. Cl.
     CPC *H02J 7/00* (2013.01); *H02J 7/0016* (2013.01)
(58) Field of Classification Search
     CPC .......... H02J 7/00; H02J 7/0016; H02J 7/0026
     See application file for complete search history.

(56) References Cited

U.S. PATENT DOCUMENTS

| 6,337,586 | B2* | 1/2002 | Aizawa | 327/108 |
| 8,522,049 | B1* | 8/2013 | Ahmadi | 713/193 |
| 2011/0003182 | A1 | 1/2011 | Zhu | |
| 2012/0161710 | A1* | 6/2012 | Mai et al. | 320/118 |

FOREIGN PATENT DOCUMENTS

| JP | 2010-067536 A | 3/2010 |
| KR | 10 2011-0004245 A | 1/2011 |
| KR | 10 2011-0029006 A | 3/2011 |
| KR | 10 2011-0096430 A | 8/2011 |

* cited by examiner

*Primary Examiner* — Nha Nguyen
(74) *Attorney, Agent, or Firm* — Lee & Morse, P.C.

(57) ABSTRACT

A cell balancing circuit includes a plurality of battery cells coupled in series, balancing switches, each balancing switch being coupled in parallel to a respective battery cell, balancing resistors, each balancing resistor being coupled in series to the respective battery cell, a balancing controller that individually controls the balancing switches such that the battery cells are discharged through the balancing resistors, and positive temperature coefficient (PTC) elements, each PTC element being positioned adjacent to a respective balancing resistor and electrically coupled to the respective balancing switch coupled in series to the respective balancing resistor.

14 Claims, 2 Drawing Sheets

CELL BALANCING CIRCUIT AND BATTERY PACK HAVING THE SAME

CROSS-REFERENCE TO RELATED APPLICATION

This application claims priority under 35 U.S.C. §119 to Korean Patent Application No. 10-2012-0088411, filed on Aug. 13, 2012, in the Korean Intellectual Property Office, the entire content of which is incorporated herein by reference.

BACKGROUND

Studies on rechargeable secondary batteries have been actively conducted with the development of portable electronic devices such as cellular phones and notebook computers. Particularly, various kinds of secondary batteries have been developed, such as a nickel-cadmium battery, a lead storage battery, a nickel metal hydride (NiMH) battery, a lithium polymer battery, a metal lithium battery and a zinc-air storage battery. Such a secondary battery is combined with a circuit so as to constitute a battery pack, and charging and discharging are performed through an external terminal of the battery pack.

SUMMARY

Embodiments are directed to a cell balancing circuit, including a plurality of battery cells coupled in series, balancing switches, each balancing switch being coupled in parallel to a respective battery cell, balancing resistors, each balancing resistor being coupled in series to the respective battery cell, a balancing controller that individually controls the balancing switches such that the battery cells are discharged through the balancing resistors, and positive temperature coefficient (PTC) elements, each PTC element being positioned adjacent to a respective balancing resistor and electrically coupled to the respective balancing switch coupled in series to a respective balancing resistor.

Each balancing switch may include an N-type field effect transistor (FET) having a gate electrode, such that a plurality of FETs and a plurality of gate electrodes are provided.

Each FET may include a source electrode coupled to a negative (−) terminal of the respective battery cell and a drain electrode coupled to a positive electrode (+) of the respective battery cell via the respective balancing resistor.

The balancing controller may apply a control signal to a gate electrode of each FET via the PTC elements.

First terminals of the PTC elements may be coupled to the gate electrodes of the FETs, respectively. Second terminals of the PTC elements may be coupled to the balancing controller.

Each PTC element may be arranged in parallel to a direction in which the respective balancing resistor is disposed so as to be positioned adjacent to the respective balancing resistors.

The cell balancing circuit may be coupled in series between the respective battery cell and the respective balancing switch.

Embodiments are also directed to a battery pack including a plurality of battery cells coupled in series, and a protection circuit including an external terminal coupled in parallel to the battery cells, a charging element and a discharging element coupled in series on a high current path between the battery cells and the external terminal, a cell balancing circuit coupled in parallel to the battery cells, the charging element and the discharging element, and a controller coupled to the cell balancing circuit. The protection circuit is mounted on an upper surface of a printed circuit board positioned adjacent to upper portions of the battery cells. Positive temperature coefficient (PTC) elements provided to the cell balancing circuit are formed on a lower surface of the printed circuit board so as to come in surface contact with the respective battery cells.

The cell balancing circuit may include balancing switches, each balancing switch being coupled in parallel to a respective battery cell, balancing resistors, each balancing resistor being coupled in series to the respective battery cell, a balancing controller that individually controls the balancing switches such that the battery cells are discharged through the balancing resistors. Each PTC element may be positioned adjacent to a respective balancing resistor and electrically coupled to the respective balancing switch coupled in series to the respective balancing resistor.

Each balancing switch may include an N-type field effect transistor (FET) having a gate electrode, such that a plurality of FETs and a plurality of gate electrodes are provided.

Each FET may have a source electrode coupled to a negative (−) terminal of a respective battery cell and a drain electrode coupled to a positive electrode (+) of the respective battery cell via the respective balancing resistor.

The balancing controller may apply a control signal to a gate electrode of each FET via the respective PTC element.

First terminals of the PTC elements may be coupled to the gate electrodes of the respective FETs. Second terminals of the PTC elements are coupled to the balancing controller.

The PTC elements and the balancing resistors corresponding thereto may be in an overlapping relationship with each other with the printed circuit board interposed therebetween.

Each balancing resistor may be coupled in series between the respective battery cell and the respective balancing switch.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
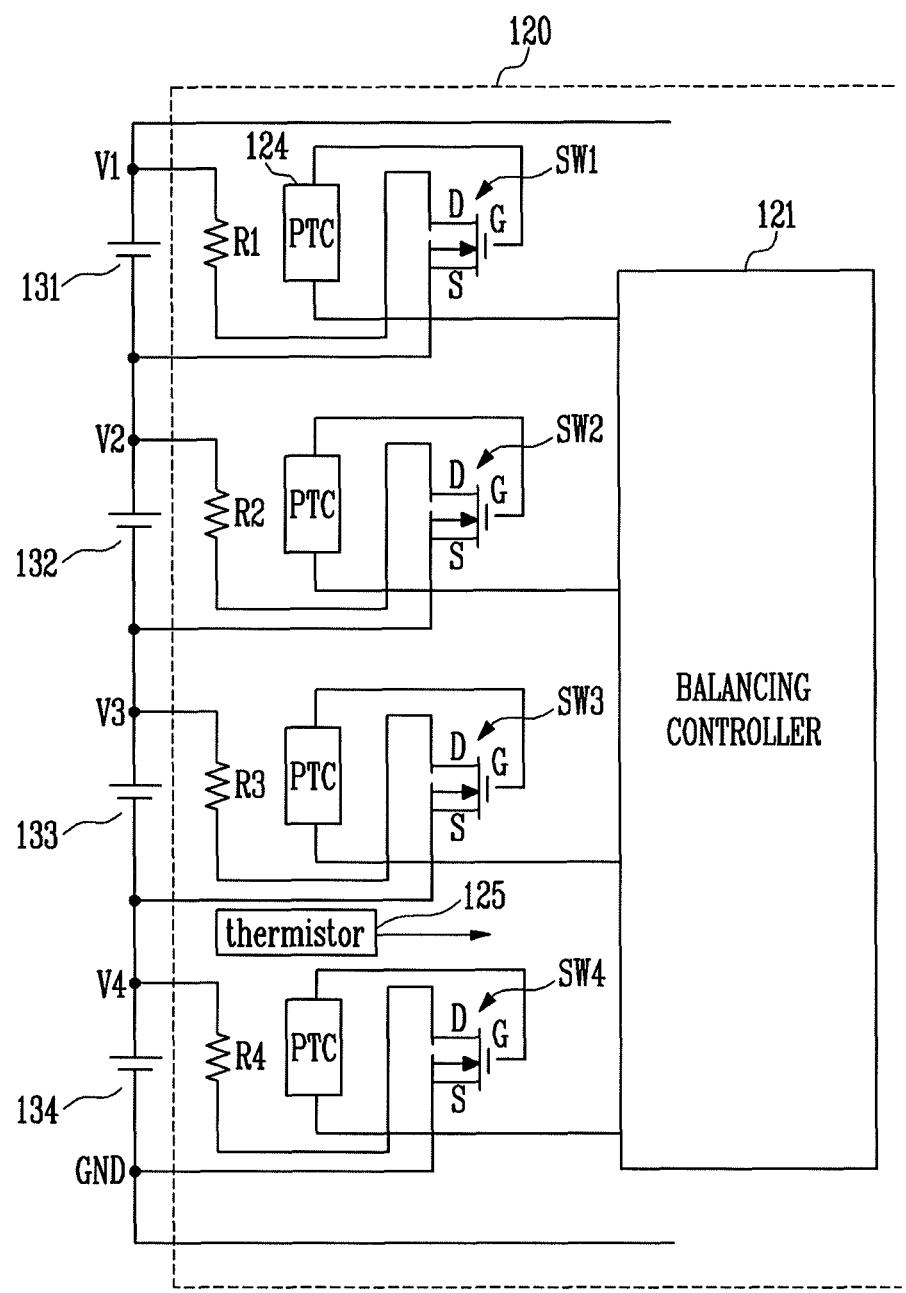
FIG. 1 illustrates a circuit diagram showing a cell balancing circuit according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

When a first element is described as being coupled to a second element, the first element may be not only directly coupled to the second element but may also be indirectly coupled to the second element via a third element.

FIG. 1 illustrates a circuit diagram showing a cell balancing circuit according to an embodiment. Referring to FIG. 1, the cell balancing circuit 120 according to this embodiment includes a balancing controller 121, a plurality of balancing switches SW1, SW2, SW3 and SW4 sequentially or simultaneously turned on or turned off by the balancing controller 121, and a plurality of balancing resistors R1, R2, R3 and R4 respectively coupled in series to the balancing switches SW1, SW2, SW3 and SW4.

As shown in FIG. 1, the balancing switches SW1, SW2, SW3 and SW4 and the balancing resistors R1, R2, R3 and R4, which are coupled in series, are coupled in parallel to battery cells 131 to 134 corresponding to the balancing switches and the balancing resistors, respectively.

In the embodiment shown in FIG. 1, the first balancing resistor R1 and the first balancing switch SW1, which are coupled in series, are coupled in parallel to the first battery cell 131. The second balancing resistor R2 and the second balancing switch SW2, which are coupled in series, are coupled in parallel to the second battery cell 132. The third balancing resistor R3 and the third balancing switch SW3, which are coupled in series, are coupled in parallel to the third battery cell 133. The fourth balancing resistor R4 and the fourth balancing switch SW4, which are coupled in series, are coupled in parallel to the fourth battery cell 134.

Although four battery cells 131 to 134 coupled in series and the balancing resistors R1 to R4 and the balancing switches SW1 to SW4, which are coupled to the respective battery cells 131 to 134, have been illustrated in the embodiment shown in FIG. 1, the number of battery cells may vary.

In the cell balancing circuit 120 configured as described above, the balancing controller 121 individually controls the balancing switches SW1, SW2, SW3 and SW4, so that the battery cells 131 to 134 may be individually discharged through the respective balancing resistors R1, R2, R3 and R4. The battery cells 131 to 134 may be balanced to have voltages similar or identical to one another by the effect of the balancing resistors.

However, if the balancing is performed through the discharging of the battery cell by the balancing resistor, heat may be generated in the balancing resistor. In a case where the temperature of the heat generated in the balancing resistor is equal to or higher than a reference temperature, it is desirable to control the heat. To this end, as shown in FIG. 1, a thermistor 125 may be provided in the cell balancing circuit 120.

The temperature sensed through the thermistor 125 may be transferred to a controller (MCU) (see FIG. 2) provided outside the cell balancing circuit 120.

However, when individual thermistors are not provided corresponding to the respective battery cells as shown in FIG. 1, the temperature of each balancing resistor may not be exactly sensed.

Accordingly, in this embodiment, positive temperature coefficient (PTC) elements 124 are provided adjacent to the balancing resistors R1 to R4, respectively, and are electrically connected to gate electrodes of respective switch elements, for example, the balancing switches SW1 to SW4, corresponding thereto, so that it may be possible to prevent the occurrence of an overcurrent caused by an abnormal high temperature of the balancing resistor and a breakdown of the switch element.

The PTC element may be an element that has a positive resistance temperature coefficient characteristic such that the resistance increases as the temperature increases. If the temperature increases, the intrinsic resistance increases, and thus the PTC element may have a high resistance corresponding to an open circuit.

To this end, in this embodiment, the balancing switches SW1 to SW4 may include N-type field effect transistors (hereinafter, referred to as 'FETs'), as shown in FIG. 1. Each FET as the balancing switch may have a source electrode S coupled to a negative (−) terminal of each battery cell and a drain electrode D coupled to a positive (+) electrode of the battery cell via the balancing resistor.

A control signal provided from the balancing controller 121 may be applied to a gate electrode G of each FET, and the turn-on/off of the FET may be controlled by the control signal.

However, the control signal is not immediately applied to the gate electrode of each FET but applied to the gate electrode of the FET via the PTC element 124.

As shown in FIG. 1, the cell balancing circuit 120 is a structure in which first terminals of the PTC elements 124 are coupled to the gate electrodes of FETs as the balancing switches SW1 to SW4, respectively, and second terminals of the PTC elements 124 are coupled to the balancing controller 121.

The PTC element 124 is positioned as close as possible to the respective balancing resistor so as to more exactly sense the heat of the balancing resistor.

To this end, each PTC element 124 is arranged in parallel to a direction in which the respective one of the balancing resistors R1 to R4 is disposed.

In the cell balancing circuit, it is assumed that an abnormal heat may be generated in a specific balancing resistor, for example, the first balancing resistor R1. In this case, the resistance of the PTC element 124 positioned adjacent to the first balancing resistor R1 is considerably increased by the heat generated in the first balancing circuit R1. As a result, an effect as if a line has been opened occurs. Accordingly, the gate electrode G of the FET coupled to the PTC element 124 is put into a floating state.

When the gate electrode G of the N-type FET is in the floating state, the gate-source voltage of the FET becomes less than or equal to a threshold voltage Vth, and therefore, the FET is automatically turned off.

Although a high-level control signal may be applied to the gate electrode G of the FET as the first balancing switch SW1 by the balancing controller 121, the gate electrode G of the FET is put into the floating state when the PTC element 124 is open. Hence, the FET is turned off regardless of the application of the control signal. Thereafter, a cell balancing operation, i.e., charging of the first battery cell 131 will not be performed.

However, unlike a fuse, the PTC element 124 can be restored. Hence, if the temperature of the first balancing resistor R1 falls to a normal temperature, the resistance is again decreased so that current flows. In this case, the floating state of the gate electrode of the FET is dissolved, and a normal cell balancing operation can again be performed by the control signal provided from the balancing controller 121.

Figure 2:
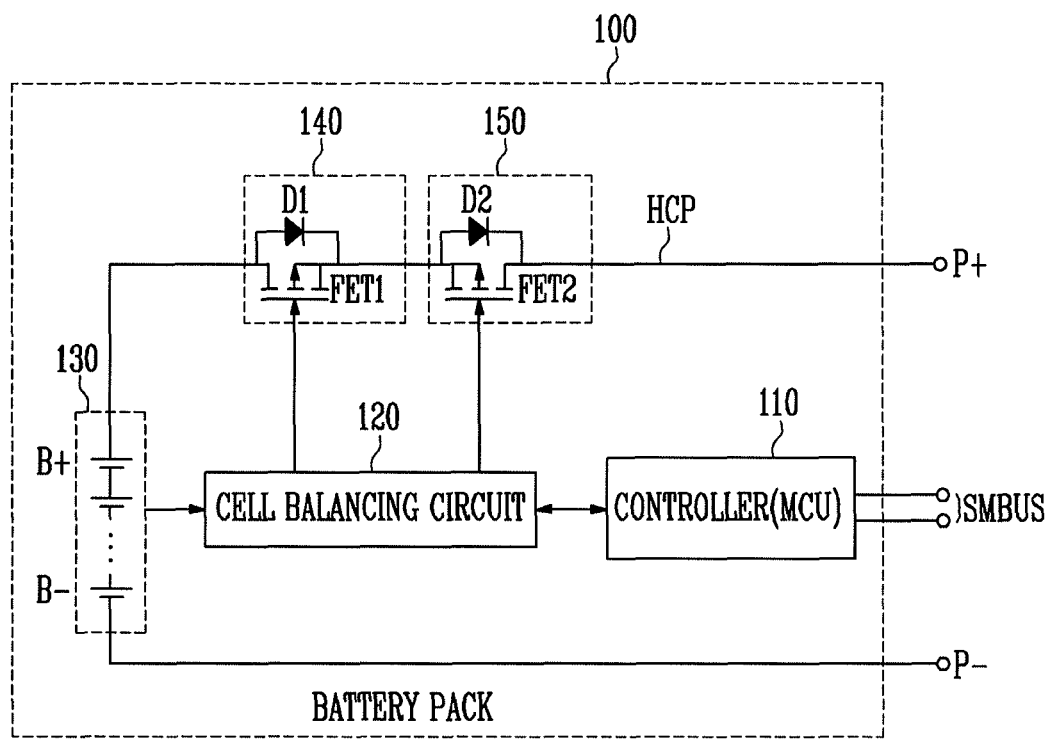
FIG. 2 illustrates a circuit diagram showing a battery pack having the cell balancing circuit shown in FIG. 1.

FIG. 2 illustrates a circuit diagram showing a battery pack having the cell balancing circuit shown in FIG. 1. Referring to FIG. 2, the battery pack 100 according to this embodiment is configured to include a rechargeable battery cell 130 and a protection circuit. The battery pack 100 may be included in an external system such as a portable notebook computer so as to perform charging and discharging to and from the battery cell 130.

The battery cell 130 may be provided with a plurality of battery cells coupled in series as shown in FIG. 2.

The battery pack 100 includes the battery cell 130, an external terminal (not shown) coupled in parallel to the battery cell 130, charging and discharging elements 140 and 150 coupled in series to a high current path (hereinafter, referred to as 'HCP') between the battery cell 130 and the external terminal, a cell balancing circuit 120 coupled in parallel to the battery cell 130, the charging element 140 and the discharging element 150, and a protection circuit having a controller (MCU) 110 coupled to the cell balancing circuit 120.

When it is determined that the battery cell 130 is in an overcharging/overdischarging state, the controller (MCU) 110 turns off the charging and discharging elements 140 and 150 so as to prevent the overcharging/overdischarging of the battery cell 130.

The battery pack 100 configured as described above is coupled to the external system through the external terminal so that the charging or discharging of the battery pack 100 is performed.

The HCP between the external terminal and the battery cell 130 is used as a charging/discharging path, and high current flows through the HCP. The battery pack 100 may further include a system management bus (SMBUS) between the controller (MCU) 100 of the protection circuit and the external terminal so as to perform communication with the external system.

Here, the external system coupled to the battery pack 100 through the external terminal may include an adapter for separately supplying power to a portable electronic device, e.g., a portable notebook computer. Accordingly, if the adapter is coupled to the external system, the external system may be operated by the adapter, and power of the adapter may be supplied to the battery cell 130 via the HCP through the external terminal so that the battery cell 130 can be charged. If the external system is separated from the adapter, the charging from the battery cell 130 to a load of the external system through the external terminal may be performed. If the external system having the adapter coupled thereto is coupled to the external terminal, a charging operation is performed. In this case, the charging path is linked from the adapter to the battery cell 130 via the discharging element 150 and the charging element 140. If the adapter is separated from the external system and the load of the external system is coupled to the external terminal, a discharging operation is performed. In this case, the discharging path is linked from the battery cell 130 to the load of the external system via the charging element 140, the discharging element 150 and the external terminal.

The battery cell 130 is a rechargeable secondary battery cell. In FIG. 2, B+ and B− indicate power terminals of the battery cell, and P+ and P− indicate power terminals of the battery pack. The battery cell 130 may output various kinds of internal information to the cell balancing circuit 120. The internal information may include cell related information such as the temperature of the battery cell, the charging voltage of the battery cell, the amount of current flowing in the battery cell, and the like.

The charging and discharging elements 140 and 150 are coupled in series on the HCP between the external terminal and the battery cell 130 so as to perform charging/discharging of the battery pack 100. Each of the charging and discharging elements 140 and 150 may be configured as an FET.

The cell balancing circuit 120 is coupled in parallel between the battery cell 130 and the charging and discharging elements 140 and 150. The cell balancing circuit 120 is coupled in series between the battery cell 130 and the controller (MCU) 110.

The cell balancing circuit 120 performs a balancing operation of the battery cell 130 under the control of the controller (MCU) 110. The configuration and operation of the cell balancing circuit 130 may be the same as described with reference to FIG. 1.

Figure 3:
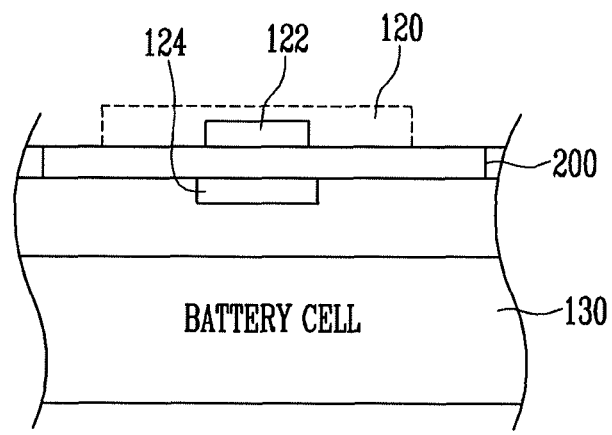
FIG. 3 illustrates a schematic view showing a configuration of a battery pack according to an embodiment.

FIG. 3 illustrates a schematic view showing a configuration of a battery pack according to an embodiment. As shown in FIGS. 2 and 3, the battery pack 100 includes the battery cell 130 and the protection circuit having the cell balancing circuit 120. The protection circuit may be manufactured on a printed circuit board (PCB) 200, and the PCB 200 may then be coupled to the battery cell 130.

The PCB 200 having the protection circuit mounted thereon may be attached adjacent to an upper portion of the battery cell 130. In this embodiment, the protection circuit having the cell balancing circuit 120 and the like may be formed on an upper surface of the PCB 200. The PTC elements 124 provided to the cell balancing circuit 120 may be located on a lower surface of the PCB 200 so as to come in surface contact with the battery cell 130.

The first and second terminals of each PTC element 124 may be electrically coupled to the balancing switch (see FIG. 1) and the balancing controller (see FIG. 1) through holes formed in the PCB 200, respectively.

As described with reference to FIG. 1, each PTC element 124 is formed adjacent to the balancing resistor 122 corresponding thereto. As shown in FIG. 3, the PTC element 124 and the balancing resistor 122 may be positioned in an overlapping relationship with each other with the PCB 200 interposed therebetween.

Through the configuration described above, each PTC element may perform a function of blocking the cell balancing operation by sensing not only heat generated in the balancing resistor corresponding thereto but also the occurrence of an abnormal high temperature in the battery cell 130.

In a case where the temperature of the battery cell 130 is increased due to an internal short circuit or the like, the cell balancing operation is blocked by the PTC element 124 positioned adjacent to the battery cell 130, so that it is possible to prevent the problem of the battery cell from being further deteriorated as the cell balancing operation is maintained.

By way of summation and review, a battery pack generally includes battery cells and a peripheral circuit having a charging/discharging circuit. The peripheral circuit is manufactured as a printed circuit board and then coupled to the battery cells. If an external power source is connected to the battery pack through an external terminal of the battery pack, the battery cells are charged by external power supplied through the external terminal and the charging/discharging circuit. If a load is connected to the battery pack through the external terminal, the operation is performed, in which the power of the battery cells is supplied to the load through the charging/discharging circuit and the external terminal. In this case, the charging/discharging circuit controls the charging/discharging of the battery cells between the external terminal and the battery cell. Generally, a plurality of battery cells may be connected in series and parallel so as to be suitable for the consumption capacity of the load.

A capacity variation between the battery cells constituting the battery pack may exist due to various reasons in the manufacturing process of the battery cells. Therefore, a difference in charging/discharging voltage between the battery cells may occur during a charging/discharging cycle. Accordingly, a specific battery cell may be overcharged in the charging of the battery pack or may be overdischarged in the discharging of the battery pack. The overcharging or overdischarging of a specific battery cell in the battery pack may decrease the capacity of the battery pack. In addition, the overcharging or overdischarging of a specific battery cell in the battery pack may degrade the battery pack and reduce the lifetime of the battery pack. Thus, a battery monitoring unit may have a balancing circuit for minimizing a difference in voltage between a plurality of battery cells connected in series. The battery monitoring unit senses the voltage of each battery cell, and performs cell balancing that may allow voltages of all the battery cells to be equalized by forcibly discharging a battery cell having a relatively high voltage when the difference in voltage between the battery cells is equal to or greater than a reference value.

The cell balancing is generally performed using a current limiting method by a resistor or a control method using a switching element. In a case where current is cut off at a high temperature, the ambient temperature is controlled using a thermistor as a temperature sensor.

However, the position at which the temperature measured by the thermistor may not reflect the temperature of the whole balancing resistors. To overcome this, one thermistor may be provided for each channel and an A/D portion of a controller (MCU) with respect to the one thermistor may be used. However, the cost of doing so is high.

In the structure of the conventional cell balancing circuit, the switching element may become broken. Therefore, in a case where the cell balancing circuit is short-circuited, it may impossible to prevent an overcurrent.

In contrast, embodiments provide a cell balancing circuit including a cell balancing resistor and a balancing switch, coupled in parallel to each battery cell, in which a positive temperature coefficient (PTC) element is provided adjacent to the balancing resistor, and the PTC element is electrically coupled to a gate electrode of the balancing switch. Accordingly, it may be possible to prevent an abnormally high temperature of the balancing resistor and the occurrence of overcurrent due to a breakdown of the balancing switch.

Embodiments may also provide a battery pack having a cell balancing circuit, in which the PCT element is positioned on a lower surface of a printed circuit board so as to be adjacent to the battery cell. Thus, the cell balancing operation may be blocked when the abnormal high temperature of the battery cell occurs, so that it may be possible to prevent the battery cell from being further deteriorated by the cell balancing operation.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A cell balancing circuit, comprising:
a plurality of battery cells coupled in series;
balancing switches, each balancing switch being coupled in parallel to a respective battery cell;
balancing resistors, each balancing resistor being coupled in series to the respective battery cell;
a balancing controller that individually controls the balancing switches such that the battery cells are discharged through the balancing resistors; and
positive temperature coefficient (PTC) elements, each PTC element being positioned adjacent to a respective balancing resistor such that each PTC element senses a temperature of the respective balancing resistor, and each PTC element being electrically coupled to the respective balancing switch coupled in series to a respective balancing resistor such that each PTC element controls the respective balancing switch based on the sensed temperature of the respective balancing resistor.

2. The cell balancing circuit as claimed in claim 1, wherein each balancing switch includes an N-type field effect transistor (FET) having a gate electrode, such that a plurality of FETs and a plurality of gate electrodes are provided.

3. The cell balancing circuit as claimed in claim 2, wherein each FET includes a source electrode coupled to a negative (−) terminal of the respective battery cell and a drain electrode coupled to a positive electrode (+) of the respective battery cell via the respective balancing resistor.

4. The cell balancing circuit as claimed in claim 3, wherein the balancing controller applies a control signal to a gate electrode of each FET via the PTC elements.

5. The cell balancing circuit as claimed in claim 2, wherein:
first terminals of the PTC elements are coupled to the gate electrodes of the FETs, respectively, and
second terminals of the PTC elements are coupled to the balancing controller.

6. The cell balancing circuit as claimed in claim 1, wherein each PTC element is arranged in parallel to a direction in which the respective balancing resistor is disposed so as to be positioned adjacent to the respective balancing resistors.

7. The cell balancing circuit as claimed in claim 1, wherein each balancing resistor is coupled in series between the respective battery cell and the respective balancing switch.

8. A battery pack, comprising:
a plurality of battery cells coupled in series; and
a protection circuit including:
an external terminal coupled in parallel to the battery cells,
a charging element and a discharging element coupled in series on a high current path between the battery cells and the external terminal,
a cell balancing circuit coupled in parallel to the battery cells, the charging element and the discharging element, and
a controller coupled to the cell balancing circuit,
wherein:
the protection circuit is mounted on an upper surface of a printed circuit board positioned adjacent to upper portions of the battery cells, and
positive temperature coefficient (PTC) elements provided to the cell balancing circuit are formed on a lower surface of the printed circuit board such that each of the PTC elements is in surface contact with a respective one of the battery cells, and
wherein the cell balancing circuit includes:
balancing switches, each balancing switch being coupled in parallel to a respective battery cell;
balancing resistors, each balancing resistor being coupled in series to the respective battery cell;
a balancing controller that individually controls the balancing switches such that the battery cells are discharged through the balancing resistors; and
each PTC element on the lower surface of the printed circuit board is positioned adjacent to a respective balancing resistor on the upper surface of the printed circuit board such that each PTC element senses a temperature of the respective balancing resistor, and each PTC element being electrically coupled to the respective balancing switch coupled in series to the respective balancing resistor such that each PTC element controls the respective balancing switch based on the sensed temperature of the respective balancing resistor.

9. The battery pack as claimed in claim 8, wherein each balancing switch includes an N-type field effect transistor (FET) having a gate electrode, such that a plurality of FETs and a plurality of gate electrodes are provided.

10. The battery pack as claimed in claim 9, wherein each FET has a source electrode coupled to a negative (−) terminal of the respective battery cell and a drain electrode coupled to a positive electrode (+) of the respective battery cell via the respective balancing resistor.

11. The battery pack as claimed in claim 10, wherein the balancing controller applies a control signal to a gate electrode of each FET via the respective PTC element.

12. The battery pack as claimed in claim 9, wherein:
   first terminals of the PTC elements are coupled to the gate electrodes of the respective FETs, and
   second terminals of the PTC elements are coupled to the balancing controller.

13. The battery pack as claimed in claim 8, wherein the PTC elements and the balancing resistors corresponding thereto are in an overlapping relationship with each other with the printed circuit board interposed therebetween.

14. The battery pack as claimed in claim 8, wherein each balancing resistor is coupled in series between the respective battery cell and the respective balancing switch.

* * * * *